US012685997B2

(12) United States Patent
Nguyen Van Nuoi et al.

(10) Patent No.: US 12,685,997 B2
(45) Date of Patent: Jul. 21, 2026

(54) MOF-BASED PRODUCT AND METHOD FOR PRODUCING MOF-BASED PRODUCTS

(71) Applicant: SAINT-GOBAIN CENTRE DE RECHERCHES ET D'ETUDES EUROPEEN, Courbevoie (FR)

(72) Inventors: Patrick Nguyen Van Nuoi, Vedene (FR); Guillaume Comte, Saint Romain en Viennois (FR); Giovanni Massasso, Salon de Provence (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 671 days.

(21) Appl. No.: 18/006,993

(22) PCT Filed: Jul. 26, 2021

(86) PCT No.: PCT/FR2021/051396
§ 371 (c)(1),
(2) Date: Jan. 26, 2023

(87) PCT Pub. No.: WO2022/023660
PCT Pub. Date: Feb. 3, 2022

(65) Prior Publication Data
US 2023/0271158 A1      Aug. 31, 2023

(30) Foreign Application Priority Data

Jul. 27, 2020     (FR) ........................................ 2007897

(51) Int. Cl.
| | |
|---|---|
| *B01J 20/22* | (2006.01) |
| *B01J 20/08* | (2006.01) |
| *B01J 20/28* | (2006.01) |
| *B01J 20/30* | (2006.01) |

(52) U.S. Cl.
CPC ............. *B01J 20/226* (2013.01); *B01J 20/08* (2013.01); *B01J 20/28026* (2013.01); *B01J 20/3007* (2013.01); *B01J 20/3042* (2013.01); *B01J 20/3078* (2013.01)

(58) Field of Classification Search
CPC .... B01J 20/226; B01J 20/08; B01J 20/28026; B01J 20/3007; B01J 20/3042; B01J 20/3078
USPC ................................................. 502/401, 415
See application file for complete search history.

(56) References Cited

U.S. PATENT DOCUMENTS

| | | | |
|---|---|---|---|
| 2014/0208650 A1 | 7/2014 | Gaab et al. | |
| 2019/0337821 A1* | 11/2019 | Jenkins .................... | B01J 20/08 |
| 2020/0338525 A1* | 10/2020 | Marlin ............... | B01J 20/28019 |
| 2021/0379559 A1* | 12/2021 | Weston ................ | B01J 20/3202 |
| 2022/0134308 A1* | 5/2022 | Kidd ........................ | C07F 15/02 556/52 |
| 2025/0161860 A1* | 5/2025 | Heraud ................ | B01J 20/3238 |

FOREIGN PATENT DOCUMENTS

| | | | | |
|---|---|---|---|---|
| KR | 20150057207 A | * | 5/2015 | ........... B01J 20/226 |

OTHER PUBLICATIONS

English translation of Written Opinion for PCT/FR2021/051396. (Year: 2021).*
Supplemental Data for "Multiscale investigation of adsorption properties of novel 3D printed UTSA-16 structures," by Carlos A. Grande et al. Chemical Engineering Journal 402, pp. 1-9. (Year: 2020).*
International Search Report as issued in International Patent Application No. PCT/FR2021/051396, dated Nov. 29, 2021.
Grande, C. A., et al., "Multiscale investigation of adsorption properties of novel 3D printed UTSA-16 structures," Chemical Engineering Journal, vol. 402, Jul. 2020, XP055786086, 9 pages.

* cited by examiner

*Primary Examiner* — Patricia L. Hailey
(74) *Attorney, Agent, or Firm* — CUSHMAN PARTNERS, LLC

(57) ABSTRACT

A product based on a metal-organic framework (MOF) and the method for producing same, the product containing particles bound by a binder, the binder including boehmite, the particles being essentially MOF particles and, optionally, particles of a ceramic material other than boehmite.

17 Claims, No Drawings

MOF-BASED PRODUCT AND METHOD FOR PRODUCING MOF-BASED PRODUCTS

CROSS-REFERENCE TO RELATED APPLICATIONS

This application is the U.S. National Stage of PCT/FR2021/051396, filed Jul. 26, 2021, which in turn claims priority to French patent application number 2007897 filed Jul. 27, 2020. The content of these applications are incorporated herein by reference in their entireties.

TECHNICAL FIELD

The present invention relates to a MOF-based product and to a method for producing MOF-based products.

PRIOR ART

In a well-known manner, a metal-organic framework, or "MOF" for short, is a material consisting of metal ions or metal clusters and organic ligands, organized so as to form a porous crystalline framework.

Their high microporosity and surface area make it possible to consider numerous industrial applications, in particular in the fields of gas storage or separation, as well as in catalysis. However, MOFs are conventionally in the form of powders, which makes their use difficult in said applications.

There is a need for MOF-based products obtained by shaping a MOF powder, said products having good mechanical strength, in particular resistance to crushing, which makes it possible, inter alia, to handle them easily, the MOF contained in said product substantially retaining its adsorption capacity compared to a powder of said MOF, for a substantially identical mass of MOF. In particular, a product according to the invention has good mechanical strength, while retaining a high adsorption capacity.

The adsorption capacity of MOFs is, in a well-known manner, directly related to the presence of small pores and a large porous volume, which come from the arrangement of the organic ligands around the metal clusters. Thus, high specific surfaces can be achieved, making MOFs particularly advantageous for adsorbing molecules or performing separation.

One aim of the invention is to at least partially meet this need.

DISCLOSURE OF THE INVENTION

According to the invention, this aim is achieved by means of a method for producing a MOF-based product comprising at least the following steps:

a) mixing raw materials to form a feedstock, said feedstock containing a MOF powder or a mixture of at least two MOF powders, a boehmite powder, and optionally a powder of another ceramic material, the amount of boehmite being such that the mass ratio of the amount of boehmite to the total amount i) of boehmite, ii) of the one or more MOF powders and iii) of the optional powder of said other ceramic material is greater than or equal to 1% and less than or equal to 25%, the amount of optional powder of said other ceramic material being such that the mass ratio of the amount of said powder to the total amount of the one or more MOF powders and the optional powder of said other ceramic material is 10% or less, b) shaping said feedstock, so as to obtain a preform, c) optionally drying said preform, d) heat-treating said preform at a temperature lower than the degradation temperature of the MOF or than the lowest degradation temperature of the MOFs, so as to obtain the MOF-based product according to the invention.

The inventors have discovered that the method according to the invention made it possible to manufacture MOF-based products, in particular in the form of macroscopic objects, that have a good crush resistance without degrading the intrinsic adsorption properties of the particles of the MOF powder(s) used. In particular, it has been discovered that the selection of the specific binder according to the invention makes it possible to preserve the porosity of the MOFs, without thus reducing its adsorption capacities and therefore its performance.

The inventors have also discovered that the method according to the invention made it possible to manufacture MOF-based products that retain their physical integrity during exposure in a humid environment or in a liquid, in particular in a solvent such as water or an alcohol, as well as a high resistance to attrition.

Preferably, the method according to the invention also has one or more of the following optional characteristics:

the mass ratio of the amount of boehmite to the total amount i) of boehmite, ii) of the one or more MOF powder(s) and iii) of the optional powder of said other ceramic material is greater than or equal to 3% and less than or equal to 13%;

the feedstock does not contain ceramic material powder other than boehmite;

the boehmite of the feedstock is peptized;

the feedstock consists of MOF powder(s), boehmite, the optional powder of said ceramic material other than boehmite, solvent, acid, organic binder, plasticizer, lubricant and pore-forming particles;

the method comprises a drying step c);

the maximum temperature reached during the heat treatment step d) is greater than the MOF degradation temperature minus (decreased by) 170° C. or than the lowest degradation temperature of the MOFs minus 170° C. and less than the MOF degradation temperature minus 5° C. or than the lowest degradation temperature of the MOFs minus 5° C.

The invention further relates to a MOF-based product comprising, and preferably constituted essentially by, or even constituted by, particles bound by a binder, said binder comprising boehmite, said particles being essentially MOF particles and, optionally, particles of a ceramic material other than boehmite.

"MOF-based product" means that said product may comprise particles of a single MOF or a mixture of at least two populations of MOF particles, preferably at least two of said populations of MOF particles are made of a different MOF, in particular selected from the list that follows.

Preferably, the MOF-based product according to the invention also has one or more of the following optional characteristics:

said binder comprises boehmite and a hydrated alumina;

said binder consists essentially of boehmite and a hydrated alumina;

more than 90% by mass of the particles bound by said binder are MOF particles;

said particles made of a ceramic material other than boehmite are particles of a material selected from $ZrO_2$, $Al_2O_3$, $SiO_2$, $TiO_2$, $ZnO$, $SiC$, $C$;

said product consists essentially of particles bound by a
binder, said binder consisting essentially of boehmite
and a hydrated alumina, the particles preferably being
essentially MOF particles;

the MOF particles are particles of a MOF or a mixture of
at least two populations of MOF particles selected from
MOF-0, MOF-2, MOF-3, MOF-4, MOF-5, MOF-6,
MOF-7, MOF-8 MOF-9, MOF-11, MOF-12, MOF-20,
MOF-25, MOF-26, MOF-31, MOF-32, MOF-33,
MOF-34, MOF-36, MOF-37, MOF-38, MOF-39,
MOF-47, MOF-49, MOF-69a, MOF-69b, MOF-74,
MOF-101, MOF-102, MOF-107, MOF-108, MOF-
110, MOF-177, MOF-j, MOF-n, IRMOF-1, IRMOF-2,
IRMOF-3, IRMOF-4, IRMOF-5, IRMOF-6, IRMOF-
7, IRMOF-8, IRMOF-9, IRMOF-10, IRMOF-11,
IRMOF-12, IRMOF-13, IRMOF-14, IRMOF-15,
IRMOF-16, IRMOF-17, IRMOF-18, IRMOF-19,
IRMOF-20, AS16, AS27-2, AS32, AS54-3, AS61-4,
AS68-7, BPR43G2, BPR48A2, BPR49B1,
BPR68D10, BPR69B1, BPR73E4, BPR76D5,
BPR80D5, BPR92A2, BPR95C5, UiO-66, UiO-67,
UiO-68, NO13, NO29, NO305, NO306A, NO330,
NO332, NO333, NO335, NO336, HKUST-1, MIL-
100, and MIL101;

the largest dimension of said product is less than 100 mm
and/or the smallest dimension of said product in a plane
perpendicular to the direction of its largest dimension is
greater than 100 micrometers.

The invention also relates to a MOF-based product
obtained or capable of being obtained by the method according to the invention.

Finally, the invention relates to a liquid filtration device,
a gas filtration device, a liquid storage device, a gas storage
device, a catalyst support, comprising a product according to
the invention, or a product obtained or capable of being
obtained by the method according to the invention.

DEFINITIONS

The compound with formula AIO(OH) is called "boeh-
mite", or aluminum hydroxide oxide.

The term "hydrated alumina" is a compound of chemical
formula $(Al_2O_3)_n \cdot (H_2O)_m$, wherein n and m are integers. In the context of this description, the boehmite is
not a hydrated alumina.

The term "degradation temperature of a MOF" refers to
the start temperature of the last mass-loss peak of the
MOF (in other words, the peak found at the highest
temperatures), as observed in thermogravimetric analysis (TGA).

"Ceramic material" is any non-metallic and non-organic
material. In the context of this application, a MOF is
therefore not considered to be a ceramic material and
carbon is considered to be a ceramic material.

The "median size" of a powder of particles is the size that
divides the particles of this powder into first and second
populations that are equal in weight, with these first and
second populations only comprising particles having a
size greater than, or less than, respectively, the median
size. The median size may for example be evaluated
using a laser particle size analyzer.

All the percentages in the present description are percentages by weight, unless indicated otherwise.

The adsorption of a MOF powder or a MOF-based
product can be measured using a breakthrough curve, making it possible to determine the maximum mass quantity of
a molecule (for example toluene) that can be adsorbed. The adsorption is expressed in the form of the ratio of said
amount to the mass of the MOF-based product according to
the invention.

The verbs "contain", "comprise" and "have" should be
interpreted broadly and without limitation, unless indicated
otherwise.

A method according to the invention will now be detailed.

In step a), the feedstock comprises at least one MOF
powder.

In one embodiment, the feedstock does not comprise a
MOF powder.

In one embodiment, the feedstock comprises at least two
MOF powders, preferably at least two of said MOF powders
are made of a different MOF.

Preferably, the MOF is selected from MOF-0, MOF-2,
MOF-3, MOF-4, MOF-5, MOF-6, MOF-7, MOF-8 MOF-9,
MOF-11, MOF-12, MOF-20, MOF-25, MOF-26, MOF-31,
MOF-32, MOF-33, MOF-34, MOF-36, MOF-37, MOF-38,
MOF-39, MOF-47, MOF-49, MOF-69a, MOF-69b, MOF-
74, MOF-101, MOF-102, MOF-107, MOF-108, MOF-110,
MOF-177, MOF-j, MOF-n, IRMOF-1, IRMOF-2, IRMOF-
3, IRMOF-4, IRMOF-5, IRMOF-6, IRMOF-7, IRMOF-8,
IRMOF-9, IRMOF-10, IRMOF-11, IRMOF-12, IRMOF-
13, IRMOF-14, IRMOF-15, IRMOF-16, IRMOF-17,
IRMOF-18, IRMOF-19, IRMOF-20, AS16, AS27-2, AS32,
AS54-3, AS61-4, AS68-7, BPR43G2, BPR48A2, BPR49B1,
BPR68D10, BPR69B1, BPR73E4, BPR76D5, BPR80D5,
BPR92A2, BPR95C5, UiO-66, UiO-67, UiO-68, NO13,
NO29, NO305, NO306A, NO330, NO332, NO333, NO335,
NO336, HKUST-1, MIL-100, and MIL101. Preferably, the
MOF is selected from UiO-66 and HKUST-1.

Preferably, the median size of the MOF powder is greater
than 0.1 μm and/or less than 100 μm.

Preferably, the degradation temperature of the MOF, or of
each MOF, is higher than 250° C.

The feedstock contains a boehmite powder, in an amount
such that the mass ratio of the amount of boehmite to the
total amount of boehmite, of the MOF powder(s) and of an
optional powder of a ceramic material (other than boehmite)
is greater than or equal to 1% and less than 11%. Preferably,
said mass ratio is greater than or equal to 2%, preferably
greater than or equal to 3%, preferably greater than or equal
to 5%.

In one embodiment, the feedstock also contains a powder
of a ceramic material other than boehmite, in an amount
such that the mass ratio of the amount of said powder to the
total amount of the MOF powder(s) and optional powder of
said other ceramic material is less than or equal to 10%.

Preferably, said optional ceramic material other than
boehmite is chosen from $ZrO_2$, $Al_2O_3$, $SiO_2$, $TiO_2$, ZnO,
SiC, C, and mixtures thereof.

In a preferred embodiment, the feedstock contains a
powder of a ceramic material other than boehmite, in an
amount such that the mass ratio of the amount of said
powder to the total amount of the MOF powder(s) and of
said optional ceramic powder is less than 5%, preferably less
than 3%, preferably less than 1%, preferably less than 0.5%.

Even more preferably, the feedstock does not contain
ceramic material powder other than boehmite.

In the method according to the invention, the MOF
powder(s), the boehmite powder, and the optional powder of
another ceramic material can be provided in the form of a
suspension or any other form comprising said powder.

In a preferred embodiment, the boehmite of the feedstock
is peptized. Peptization of the boehmite is an operation well
known to a skilled person. It consists of the dispersion of a
boehmite powder in an acidic aqueous solution, so as to lead to the at least partial dissolution of the boehmite particles. Advantageously, peptizing the boehmite in the feedstock makes it possible to increase the amount of boehmite in said charge and/or makes it possible to reduce the viscosity of said feedstock.

The peptization of the boehmite can be carried out by introducing the boehmite powder into water so as to obtain a suspension, then by adjusting the pH of said suspension to a value preferably greater than 1, preferably greater than 2, and/or less than 7, preferably less than 6, preferably less than 5.

In a preferred embodiment, the pH adjustment is carried out using an acid addition, preferably selected from nitric acid, formic acid, maleic acid, oxalic acid and mixtures thereof.

More preferably, the peptization of the boehmite in the feedstock is carried out before the introduction of the MOF powder(s) and optional powder of a ceramic material other than boehmite.

As is well known to the skilled person, the feedstock may comprise, in addition to the MOF powder(s), boehmite, and optional powder of a ceramic material other than boehmite, a solvent and/or an organic binder and/or a plasticizer and/or a lubricant and/or pore-forming particles, the natures and amounts of which are adapted to the shaping method of step b).

Preferably the solvent is water. The amount of solvent is adapted to the shaping method implemented in step b).

The feedstock optionally contains an organic binder facilitating the formation of the preform, preferably in a content of between 0.1% and 10%, preferably between 0.2% and 2% by mass based on the mass of the MOF powder(s), boehmite, and powder of a ceramic material other than the optional boehmite of the feedstock.

All the organic binders conventionally used for the manufacture of porous ceramic products can be implemented, for example polyvinyl alcohol (PVA) or polyethylene glycols (PEG), starch, xanthan gum, methylcellulose, ethylcellulose, carboxymethyl cellulose, carboxyethylcellulose, hydroxyethyl cellulose, methylstearate, ethylstearate, waxes, polyolefins, polyolefin oxides, glycerin, propionic acid, maleic acid, benzyl alcohol, isopropanol, butyl alcohol, a dispersion of paraffin and polyethylene, and mixtures thereof.

The feedstock optionally contains a plasticizer, which also facilitates the formation of the preform.

Preferably, the plasticizer content is between 1% and 10%, preferably between 1% and 5%, by mass based on the mass of the MOF powder(s), boehmite, and powder of a ceramic material other than the optional boehmite of the feedstock. The plasticizer may constitute a binder.

All the plasticizers conventionally used for the manufacture of porous ceramic products can be used, for example polyethylene glycol, polyolefin oxides, hydrogenated oils, alcohols, in particular glycerol and glycol, esters, starch, and mixtures thereof.

The feedstock optionally contains a lubricant, which also facilitates the formation of the preform.

Preferably, the lubricant content is between 1% and 10%, preferably between 1% and 5%, by mass based on the mass of the MOF powder(s), boehmite, and powder of a ceramic material other than the optional boehmite of the feedstock.

All the lubricants conventionally used for the manufacture of porous ceramic products can be used, for example petroleum jelly and/or waxes.

The feedstock optionally contains pore-forming particles, well known to a skilled person, which are intended to be eliminated during the heat treatment of step d), thus leaving the space to pores. Their quantity and dimensions are chosen so as in particular to adjust the porous volume in the MOF-based product obtained at the end of step d). The choice of the optional pore-forming particles is carried out as a function of the maximum temperature of the heat treatment in step d).

The presence and nature of the binder and/or lubricant depend in particular on the shaping technique used in step b).

In a preferred embodiment, the feedstock does not contain constituents other than the MOF powder(s), boehmite, optional powder of said ceramic material other than boehmite, a solvent, an acid, an organic binder, a plasticizer, a lubricant and pore-forming particles.

In one most preferred embodiment, the feedstock does not contain constituents other than the MOF powder(s), boehmite, a solvent, an acid, an organic binder, a plasticizer, a lubricant and pore-forming particles.

Preferably, boehmite, solvent, preferably water and acid are mixed so as to obtain an intimate mixture. Next, the other constituents of the feedstock, in particular the MOF powder(s), the powder of a ceramic material other than boehmite, the binder, lubricant, plasticizer and optional pore-forming particles are added with stirring. The amount of solvent, preferably water, can be added in several stages, in an amount determined according to the technique chosen for shaping.

The mixing of the various constituents of the feedstock can be carried out according to any technique known to the skilled person, for example in a mixer, preferably in a high intensity mixer or in a Z-arm mixer, in turbulate, in a jar mill with balls, preferably alumina beads. The mixing is preferably carried out in a high intensity mixer or in a Z-arm mixer The total mixing time is preferably greater than 5 minutes, and preferably less than 30 minutes, preferably less than 20 minutes.

In step b), the feedstock is shaped so as to obtain a preform.

The shaping can be carried out according to any technique known to a skilled person, for example extrusion, granulation, pressing, casting, atomization, screen printing, or tape casting.

The preforms obtained can be in the form of cylinders, polylobes, rings, or spheres.

In step c), which is optional, the preform is dried.

The maximum temperature reached during the drying cycle is lower than the degradation temperature of the MOF or the lowest degradation temperature of the MOFs.

Preferably, the maximum temperature reached during the drying cycle is greater than 50° C., and preferably greater than 80° C., preferably less than 150° C., preferably less than 120° C.

Also preferably, the drying cycle has a plateau at said maximum temperature reached. The holding time at the plateau is preferably greater than 1 hour, preferably greater than 2 hours and preferably less than 20 hours, preferably less than 12 hours.

Drying is preferably carried out in air at atmospheric pressure.

In step d), the preform undergoes heat treatment at a temperature lower than the degradation temperature of the MOF or than the lowest degradation temperature of the MOFs, so as to obtain a MOF-based product.

Preferably, the preform is shaped so that the largest dimension of the MOF-based product is less than 100 mm, preferably less than 80 mm, preferably less than 50 mm, preferably less than 30 mm, or even less than 10 mm and/or so that the smallest dimension of the MOF-based product in a plane perpendicular to the direction of the largest dimension is greater than 100 µm (micrometers).

Preferably, the maximum temperature reached during the heat treatment cycle is greater than the degradation temperature of the MOF minus 170° C. or than the lowest temperature of degradation of the MOFs minus 170° C., preferably higher than the degradation temperature of the MOF minus 150° C. or than the lowest degradation temperature of the MOFs minus 150° C., preferably higher than the degradation temperature of the MOF minus 130° C. or than the lowest degradation temperature of the MOFs minus 130° C., and preferably lower than the degradation temperature of the MOF minus 5° C. or than the lowest degradation temperature of the MOFs minus 5° C., preferably lower than the degradation temperature of the MOF minus 10° C. or than the lowest degradation temperature of the MOFs minus 10° C.

Preferably, while complying with the conditions described immediately above, if the degradation temperature of the MOFs allows it, the maximum temperature reached during the heat treatment cycle is greater than 150° C., preferably greater than 180° C., preferably greater than 200° C., and preferably less than 300° C., preferably less than 250° C.

Also preferably, the heat treatment cycle has a plateau at said maximum temperature reached. The holding time at the plateau is preferably greater than 0.5 hours, preferably greater than 1 hour, preferably greater than 2 hours, and preferably less than 10 hours, preferably less than 5 hours, preferably less than 4 hours.

When the MOF powder used in step a) is a UiO-66 powder, the degradation temperature of said MOF being substantially equal to 400° C., the maximum temperature reached during the heat treatment of step d) is preferably greater than 130° C., preferably greater than 150° C., preferably greater than 170° C., preferably greater than 180° C., preferably greater than 200° C., and less than 395° C., preferably less than 390° C., preferably less than 300° C., preferably less than 250° C.

When the MOF powder used in step a) is a HKUST-1 powder, the degradation temperature of said MOF being substantially equal to 260° C., the maximum temperature reached during the heat treatment of step d) is preferably greater than 90° C., preferably greater than 110° C., preferably greater than 130° C., preferably greater than 150° C., preferably greater than 180° C., preferably greater than 200° C., and less than 255° C., preferably less than 250° C.

The heat treatment is preferably carried out in air at atmospheric pressure.

In one embodiment, the optional step c) and step d) are carried out in the same thermal cycle.

At the end of step d), a MOF-based product is obtained. The MOF-based product can be in the form of cylinders, polylobes, rings, or spheres.

The invention further relates to a MOF-based product comprising, and preferably constituted essentially by, or even constituted by, particles bound by a binder, said binder comprising boehmite, said particles being essentially MOF particles and, optionally, particles of a ceramic material other than boehmite.

Such a product is in particular derived from a method as described above.

Preferably, the binder of the MOF-based product according to the invention comprises boehmite and a hydrated alumina and more preferably consists essentially of boehmite and a hydrated alumina.

Thus, the amount of boehmite, or of boehmite and hydrated alumina, in said product is less than 11%, and preferably is between 1 and 10% by weight, preferably between 3 and 10% by weight.

In the MOF-based product (or macroscopic object) according to the invention, the boehmite and the hydrated alumina contained in the binder may for example be demonstrated by X-ray diffraction.

Preferably, the MOF-based product according to the invention is composed of particles bound by a binder consisting essentially of boehmite and a hydrated alumina.

In one embodiment, the MOF-based product according to the invention is composed of particles bound by a binder comprising boehmite, said particles being for more than 90%, preferably for more than 95%, preferably for more than 97%, preferably for more than 99%, more preferably for more than 99.5% by mass of the MOF particles, the complement to the MOF particles being particles made of a ceramic material other than boehmite.

In a preferred embodiment, the MOF-based product according to the invention is composed of particles bound by a binder comprising boehmite, preferably consisting substantially of boehmite and a hydrated alumina, said particles being for more than 90%, preferably for more than 95%, preferably for more than 97%, preferably for more than 99%, more preferably for more than 99.5% by mass of the MOF particles, the complement to the MOF particles being particles made of a ceramic material other than boehmite.

Preferably, the MOF-based product according to the invention consists essentially of MOF particles bound by a binder comprising boehmite.

Even more preferably, the MOF-based product according to the invention is composed essentially of MOF particles bound by a binder comprising, and preferably consisting essentially of, boehmite and a hydrated alumina.

Preferably, when the MOF-based product according to the invention comprises particles made of a ceramic material other than boehmite, said particles are particles of $ZrO_2$, $Al_2O_3$, $SiO_2$, $TiO_2$, ZnO, SiC, C, and mixtures thereof.

Preferably, the MOF particles of the MOF-based product according to the invention are particles of a MOF or a mixture of at least two populations of MOF particles selected from MOF-0, MOF-2, MOF-3, MOF-4, MOF-5, MOF-6, MOF-7, MOF-8 MOF-9, MOF-11, MOF-12, MOF-20, MOF-25, MOF-26, MOF-31, MOF-32, MOF-33, MOF-34, MOF-36, MOF-37, MOF-38, MOF-39, MOF-47, MOF-49, MOF-69a, MOF-69b, MOF-74, MOF-101, MOF-102, MOF-107, MOF-108, MOF-110, MOF-177, MOF-j, MOF-n, IRMOF-1, IRMOF-2, IRMOF-3, IRMOF-4, IRMOF-5, IRMOF-6, IRMOF-7, IRMOF-8, IRMOF-9, IRMOF-10, IRMOF-11, IRMOF-12, IRMOF-13, IRMOF-14, IRMOF-15, IRMOF-16, IRMOF-17, IRMOF-18, IRMOF-19, IRMOF-20, AS16, AS27-2, AS32, AS54-3, AS61-4, AS68-7, BPR43G2, BPR48A2, BPR49B1, BPR68D10, BPR69B1, BPR73E4, BPR76D5, BPR80D5, BPR92A2, BPR95C5, UiO-66, UiO-67, UiO-68, NO13, NO29, NO305, NO306A, NO330, NO332, NO333, NO335, NO336, HKUST-1, MIL-100, and MIL101, preferably selected from UiO-66 and HKUST-1.

In one embodiment, when the MOF-based product according to the invention comprises a mixture of at least two populations of MOF particles, at least two of said populations of MOF particles are of a different MOF.

Preferably, the degradation temperature of the MOF, or of each MOF, is higher than 250° C.

The MOF-based product according to the invention can be in the form of cylinders, polylobes, rings, or spheres.

Preferably, the largest dimension of the MOF-based product according to the invention (or macroscopic object according to the invention) is less than 100 mm, preferably less than 80 mm, preferably less than 50 mm, preferably less than 30 mm, or less than 10 mm. More preferably, the smallest dimension of the MOF-based product according to the invention (or macroscopic object according to the invention), in a plane perpendicular to the direction of the largest dimension, is greater than 100 μm.

The invention also relates to a MOF-based product obtained or capable of being obtained by the method according to the invention.

EXAMPLES

The following non-limiting examples are given with the aim of illustrating the invention.
Measurement Protocols The toluene adsorption capacity of the examples is conventionally measured from a breakthrough curve carried out in a fixed bed, at room temperature, in a glass reactor having a diameter equal to 14 mm, with a gas flow composed of helium containing 100 ppm of toluene, injected at a flow rate of 6 liters per hour, the quantity of the products of the examples being between 0.6 g and 1 g, said products being dried beforehand at 50° C. for 15 minutes.

The result is expressed in mg of toluene per gram of product characterized.

The crush resistance of the examples is evaluated using the following method. A sample of the product of the examples to be characterized (taking the form of a cylinder) is placed, on one of its circular faces (i.e. standing), on the lower plate of a Shimadzu press, model AGS-X, equipped with a 100 N sensor. The upper plate of the press then descends at a speed equal to 0.5 mm/min until the sample is crushed. The maximum force measured when the sample is crushed is the compressive strength of the sample. For each of the products of the examples, this operation is carried out on 5 cylinders. The compressive strength value of the example announced in Table 1 is an arithmetic mean of the 5 values.
Manufacturing Protocol The following raw materials were used to produce the examples.

a UiO-66 MOF powder, sold by Sigma Aldrich, having a median size equal to 1.3 μm, for examples 1 to 3,
   a colloidal suspension of Nextsil 20K-30 amorphous silica, sold by Nyacol, having a solid charge equal to 30% by mass, for example 1, outside the invention,
   a Disperal P2 boehmite powder, sold by SASOL, for example 2 according to the invention and example 3, outside the invention,
   glacial acetic acid, sold by Sigma Aldrich, for examples 1 to 3.

The product of example 1, outside the invention, was obtained in the following manner. 1.67 g of Nextsil 20K-30 colloidal silica is mixed in 5.83 g of distilled water using a paddle stirrer, then 0.03 g of acetic acid is added. Next, 9.5 g of UiO-66 is added and the whole is stirred for 1 hour. A feedstock is obtained in the form of a homogeneous suspension. Next, said feedstock is then spread on a metal grid with a thickness of 1 mm and perforated with circular holes with a diameter of 1.5 mm, then scraped with a spatula on each side of the grid so that said feedstock fills the holes of said grid. The grid is then called "charged". After 24 hours of maintaining at room temperature, the charged grid is dried for 24 hours at 50° C. The product present in the holes in the grid is then recovered using tapping on the grid. It is in the form of cylinders. Said cylinders are then dried in the following way: They are inserted into an oven at 250° C., in air, and maintained at this temperature for 2 hours and then removed. After said drying, the product of example 1, outside the invention, is in the form of cylinders with a mean length equal to 0.8 mm and a mean diameter equal to 1.4 mm.

The MOF-based product of example 2, according to the invention, was obtained using the method according to the invention, by screen printing as follows. In step a), 0.50 g of Disperal P2 boehmite is mixed in 7.00 g of distilled water using a paddle stirrer, then 0.03 g of acetic acid is added. Next, 9.50 g of the MOF UiO-66 is added and the whole is stirred for 1 hour. The feedstock is then in the form of a homogeneous suspension. In step b), said feedstock is then spread on a metal grid with a thickness of 1 mm and perforated with circular holes with a diameter of 1.5 mm, then scraped with a spatula on each side of the grid so that said feedstock fills the holes of said grid. The grid is then called "charged". In step c), after 24 hours of maintaining at room temperature, the charged grid is dried for 24 hours at 50° C. The product present in the holes in the grid is then recovered by tapping on the grid. It is in the form of cylinders. Next, in step d), said cylinders are then dried in the following way: They are inserted in an oven at 250° C., in air, and maintained at this temperature for 2 hours and then removed. After said drying, the product of example 2, according to the invention, is in the form of cylinders with a mean length equal to 0.8 mm and a mean diameter equal to 1.4 mm.

The product of example 3, outside the invention, was obtained in the following manner. 1.10 g of Disperal P2 boehmite is mixed in 7.00 g of distilled water using a paddle stirrer, then 0.03 g of acetic acid is added. Next, 8.90 g of the MOF UiO-66 is added and the whole is stirred for 1 hour. A feedstock is obtained in the form of a homogeneous suspension. Next, said feedstock is then spread on a metal grid with a thickness of 1 mm and perforated with circular holes with a diameter of 1.5 mm, then scraped with a spatula on each side of the grid so that said feedstock fills the holes of said grid. The grid is then called "charged". After 24 hours of maintaining at room temperature, the charged grid is dried for 24 hours at 50° C. The product present in the holes in the grid is then recovered using tapping on the grid. It is in the form of cylinders. Said cylinders are then dried in the following way: They are inserted into an oven at 250° C., in air, and maintained at this temperature for 2 hours and then removed. After said drying, the product of example 3, outside the invention, is in the form of cylinders with a mean length equal to 0.8 mm and a mean diameter equal to 1.4 mm.

Table 1 below summarizes the results obtained.

TABLE 1

| Example | Amount of boehmite (as a % based on the amount of boehmite + MOF powder) | Compressive strength (N) | Toluene adsorption capacity (mg/g of tested product) |
|---|---|---|---|
| 1(*) | 0 | 1 | 14 |
| 2 | 5 | 7 | 12 |
| 3(*) | 11 | 8 | not measured |

(*)outside the invention

A comparison of comparative example 1, and of example 2 according to the invention, shows that the product of example 2 has a compressive strength equal to 7N, much higher than that of the product of example 1 equal to 1 N, both products having similar toluene adsorption capacities.

A comparison of example 2 according to the invention and example 3 outside the invention shows that the product of example 2, produced by a method according to the invention in which the feedstock has an amount of boehmite such that the mass ratio of the amount of said boehmite to the total amount of boehmite and MOF powder equal to 5%, has a compressive strength equal to 7N, close to the compressive strength of the product of example 3, equal to 8N, said product of example 3 being produced by a method in which the feedstock has a quantity of boehmite such that the mass ratio of the amount of said boehmite to the total amount of boehmite and of MOF powder is equal to 11%.

Of course, the invention is not limited to the embodiments described, which are provided merely for illustrative purposes.

The invention claimed is:

1. A MOF-based product, said MOF-based product comprising particles bound by a binder, said binder comprising boehmite, said particles being essentially MOF particles and optionally particles of a ceramic material other than boehmite and said MOF-based product comprising particles bound by a binder, said binder consisting essentially of boehmite and a hydrated alumina.

2. The MOF-based product according to claim 1, wherein the amount of boehmite in said product is less than 11% by weight.

3. The MOF-based product according to claim 2, wherein the amount of boehmite in said product is between 1 and 10% by weight.

4. The MOF-based product according to claim 2, wherein the amount of boehmite in said product is between 3 and 10% by weight.

5. The MOF-based product according to claim 1, wherein more than 90% by mass of the particles bound by said binder are MOF particles.

6. The MOF-based product according to claim 1, wherein said particles made of a ceramic material other than boehmite are particles of a material selected from the group consisting of $ZrO_2$, $Al_2O_3$, $SiO_2$, $TiO_2$, ZnO, SiC, and C.

7. The MOF-based product according to claim 1, wherein the MOF particles are particles of an MOF or a mixture of at least two populations of MOF particles selected from the group consisting of MOF-0, MOF-2, MOF-3, MOF-4, MOF-5, MOF-6, MOF-7, MOF-8 MOF-9, MOF-11, MOF-12, MOF-20, MOF-25, MOF-26, MOF-31, MOF-32, MOF-33, MOF-34, MOF-36, MOF-37, MOF-38, MOF-39, MOF- 47, MOF-49, MOF-69a, MOF-69b, MOF-74, MOF-101, MOF-102, MOF-107, MOF-108, MOF-110, MOF-177, MOF-j, MOF-n, IRMOF-1, IRMOF-2, IRMOF-3, IRMOF-4, IRMOF-5, IRMOF-6, IRMOF-7, IRMOF-8, IRMOF-9, IRMOF-10, IRMOF-11, IRMOF-12, IRMOF-13, IRMOF-14, IRMOF-15, IRMOF-16, IRMOF-17, IRMOF-18, IRMOF-19, IRMOF-20, AS16, AS27-2, AS32, AS54-3, AS61-4, AS68-7, BPR43G2, BPR48A2, BPR49B1, BPR68D10, BPR69B1, BPR73E4, BPR76D5, BPR80D5, BPR92A2, BPR95C5, UiO-66, UiO-67, UiO-68, NO13, NO29, NO305, NO306A, NO330, NO332, NO333, NO335, NO336, HKUST-1, MIL-100, and MIL101.

8. The MOF-based product according to claim 1, wherein a largest dimension of said product is less than 100 mm and/or a smallest dimension of said product in a plane perpendicular to a direction of its largest dimension is greater than 100 micrometers.

9. A method for producing a MOF-based product according to claim 1, comprising:
a) mixing raw materials to form a feedstock, said feedstock containing a MOF powder or a mixture of at least two MOF powders, a boehmite powder, and optionally a powder of another ceramic material, an amount of boehmite being such that a mass ratio of the amount of boehmite to the total amount i) of boehmite, ii) of the one or more MOF powder(s) and iii) optionally of the powder of said other ceramic material is greater than or equal to 1% and less than or equal to 11%, the amount of powder of said other ceramic material being such that the mass ratio of the amount of said powder to the total amount of the one or more MOF powder(s) and optionally of the powder of said other ceramic material is less than or equal to 10%,
b) shaping said feedstock, so as to obtain a preform,
c) optionally drying said preform, and
d) heat-treating said preform at a temperature lower than the degradation temperature of the MOF or than the lowest degradation temperature of the MOFs.

10. The method for obtaining a MOF-based product according to claim 9, wherein the mass ratio of the amount of boehmite to the total amount i) of boehmite, ii) of the one or more MOF powder(s) and iii) of the optional powder of said other ceramic material is greater than or equal to 3% and less than 11%.

11. The method for obtaining a MOF-based product according to claim 9, wherein the feedstock does not contain ceramic material powder other than boehmite.

12. The method for obtaining a MOF-based product according to claim 9, wherein the boehmite of the feedstock is peptized.

13. The method for obtaining a MOF-based product according to claim 9, wherein the feedstock consists of MOF powder(s), boehmite, the optional powder of said ceramic material other than boehmite, solvent, acid, organic binder, plasticizer, lubricant, and pore-forming particles.

14. The method for obtaining a MOF-based product according to claim 9, comprising a drying step c).

15. The method for obtaining a MOF-based product according to claim 9, wherein the maximum temperature reached during the heat treatment step d) is greater than the MOF degradation temperature minus 170° C. or the lowest degradation temperature of the MOFs minus 170° C. and less than the MOF degradation temperature minus 5° C. or the lowest degradation temperature of the MOFs minus 5° C.

16. A device comprising a MOF-based product according to claim 1, said device being chosen from a liquid filtration device, gas filtration device, liquid storage device, gas storage device, or catalyst support.

17. A MOF-based product, said MOF-based product comprising particles bound by a binder, said binder comprising boehmite, said particles being essentially MOF particles and optionally particles of a ceramic material other than boehmite and said MOF-based product consisting essentially of particles bound by a binder, said binder consisting essentially of boehmite and a hydrated alumina.

* * * * *